United States Patent [19]

Maschio

[11] 4,158,390
[45] Jun. 19, 1979

[54] FARMING IMPLEMENT PARTICULARLY FOR ROW CULTIVATION

[75] Inventor: Antonio Maschio, Campodarsego, Italy

[73] Assignee: F. lli Maschino S.n.c., Campodarsego, Italy

[21] Appl. No.: 753,552

[22] Filed: Dec. 22, 1976

[30] Foreign Application Priority Data

Mar. 29, 1976 [IT] Italy ................................ 41561 A/76

[51] Int. Cl.² ........................ A01B 69/06; A01B 65/02
[52] U.S. Cl. .......................................... 172/5; 172/233; 172/667; 280/468
[58] Field of Search ................. 172/5, 38, 59, 233, 172/679, 741, 324, 446, 476, 667; 280/460 R, 460 A, 461 R, 461 A, 467, 468

[56] References Cited

U.S. PATENT DOCUMENTS

| 3,430,723 | 3/1969 | Brooks ........................... 172/5 X |
| 3,821,989 | 7/1974 | van der Lely et al. .............. 172/59 |

FOREIGN PATENT DOCUMENTS

| 1223046 | 1/1960 | France ......................... 172/233 |
| 1261272 | 4/1961 | France ......................... 172/233 |
| 605165 | 5/1960 | Italy ............................. 172/5 |
| 103201 | 10/1962 | Netherlands ..................... 172/5 |
| 438371 | 1/1975 | U.S.S.R. ......................... 172/5 |

*Primary Examiner*—Richard T. Stouffer
*Attorney, Agent, or Firm*—Fleit & Jacobson

[57] ABSTRACT

A farming implement, particularly for row cultivation, wherein the operator device comprises a mill or harrow having substantially vertical axes or slightly inclined to the vertical, and connected to the tractor by the interposition of an automatic device for transverse movement relative to the tractor, transversely displacing the implement and securing it at any intermediate position.

1 Claim, 7 Drawing Figures

FARMING IMPLEMENT PARTICULARLY FOR ROW CULTIVATION

This invention relates to an implement for application to a tractor, the implement being driven therefrom for milling, tilling, grubbing or other essential processing for general good soil or land maintenance, and particularly for processing in row cultivation, such as orchards and vineyards.

In the latter, the requirement is known to carry out the above mentioned works also between row plants.

Therefrom arises the novelty of the invention for an implement provided with an automatic device which is highly responsive in signalling a plant or obstacle and displacing through a suitable control the machine in a sidewise direction and reintroducing the same in the row after passing the obstacles, and this without reducing the feeding speed or the tractor path.

As a work processing machine, a milling implement has been adapted as that having a plurality of tools with vertical axes, and this for the remarkable land or soil works that can be provided thereby, such as good breakage, levelling, as well as a substrate bed, broken but not crushed for a good drainage.

An embodiment of the implement according to the present invention and the operation of such an implement will now be described with reference to the accompanying drawings, in which.

Figure 1:
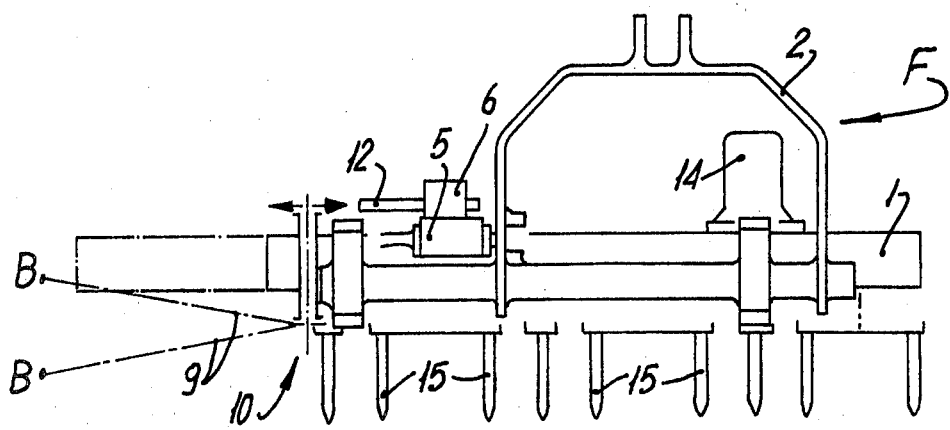
FIG. 1 is a front elevational view of the implement according to the invention.
Figure 2:
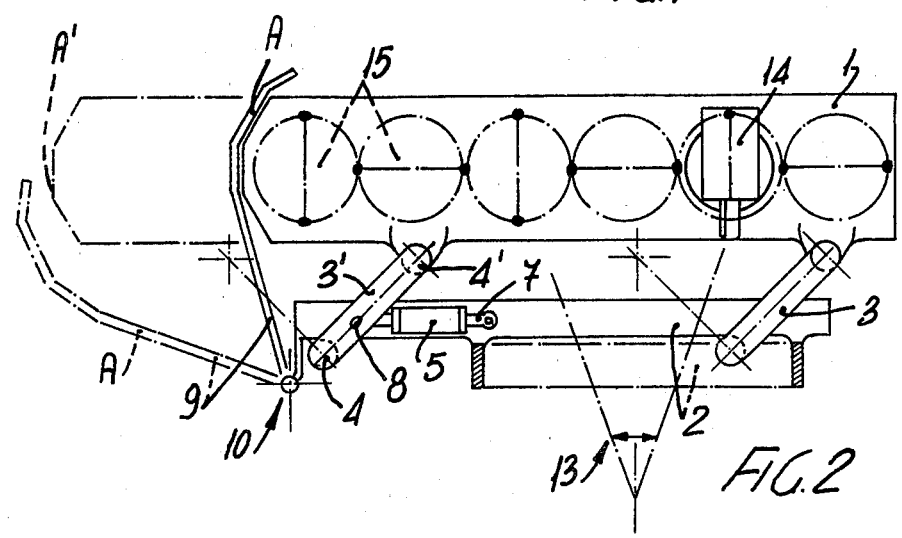
FIG. 2 is a plan view of the implement shown in FIG. 1.
Figure 3:
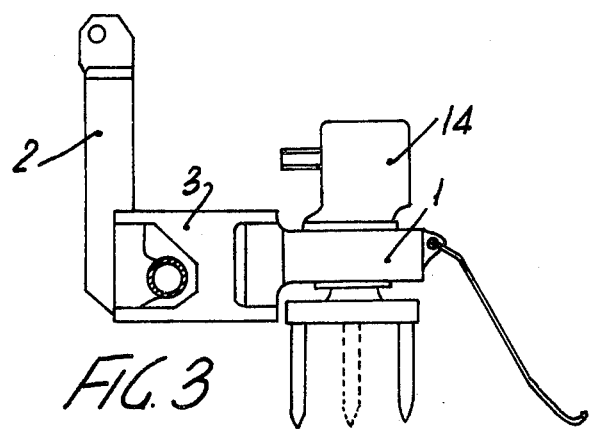
FIG. 3 is a side view taken in the direction of arrow F in FIG. 1.

The machine, as shown in FIGS. 1, 2, and 3, comprises as a whole two main parts, that is a transverse beam or body 1 carrying the operating tools 15, and a fork frame 2 serving as a support or mounting for beam 1, and by means of which the machine is coupled to a driving tractor 16 (FIG. 4), being rotably driven therefrom by means of a universal joint 13 (FIG. 2) connecting power take-off of tractor 16 to reduction gear 14 (FIG. 3), and this either directly or by means of a gearbox.

Said fork frame 2, having the controls mounted thereon, supports said beam 1 by means of two arms 3 and 3''' hinged or pivoted at the respective ends to two mountings 4 and 4''.

An oleodynamic cylinder 5 (FIG. 1), that can be supplied by a pump driven by said reduction gear 14 or tractor 16, is connected by means of an articulated joint 7 to frame 2 and by means of an articulated joint 8 to one of said hinged or pivoted arms 3 and 3', to cause the rotation thereof for laterally moving the operating tools 15 carried on the milling body 1.

Frame 2 has also mounted thereon a feeler arm 9 which, by means of a spindle 10 and a lever and cam device, not shown, controls a sensing member or piston rod 12 of a distributor 6 operating said cylinder 5. This feeler 9 oscillates about spindle or support 10 from a position A, corresponding to fully retracted mill or beam 1 to a position A' corresponding to beam 1 with the mill completely outwardly extended, that is operating on the row axis between one plant and the adjoining one. Said feeler 9 is also vertically adjustable from position B to position B' to accomodate the work depth, while at the plant contact location it is necessary to avoid to work on the grafts in order not to damage the same.

The solution herein shown is given by mere way of indication, it being understood that the relative movement of said beam 1 and frame 2 could occur in any way well known in the art and other than oleodynamically.

Figure 4:
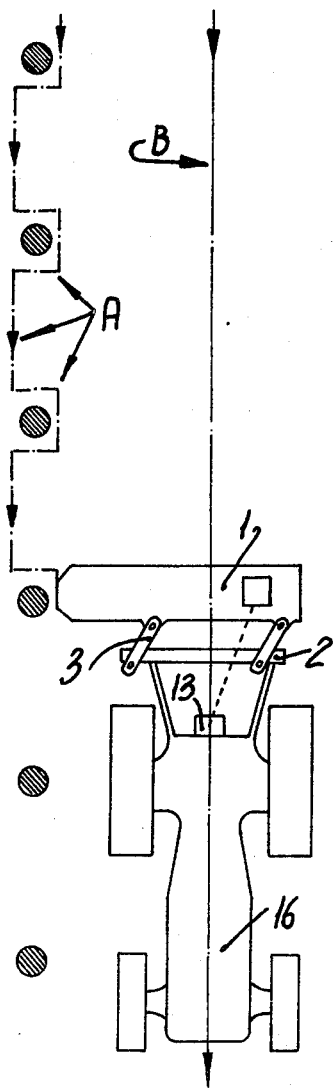
FIG. 4 is a top view showing the work scheme or diagram of the implement with tractor between two rows.
Figure 5:
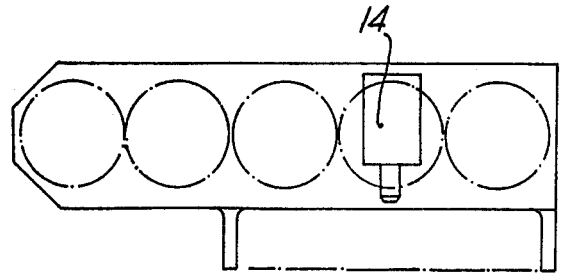
FIG. 5 shows a completely sidewise exemplary embodiment as fixed relative to the tractor.
Figure 6:
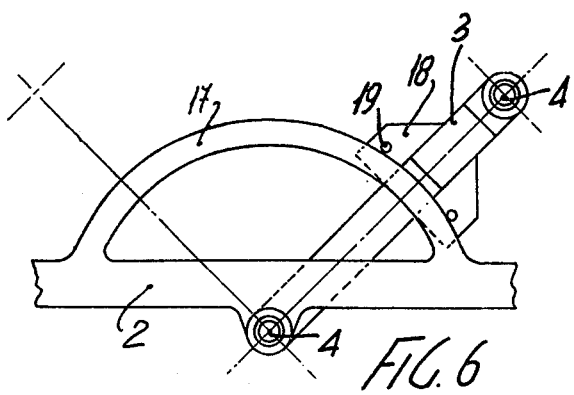
FIG. 6 is an exemplary manually positioning and fixing embodiment for the transverse displacement of cutter or mill illustrated in FIG. 1.
Figure 7:
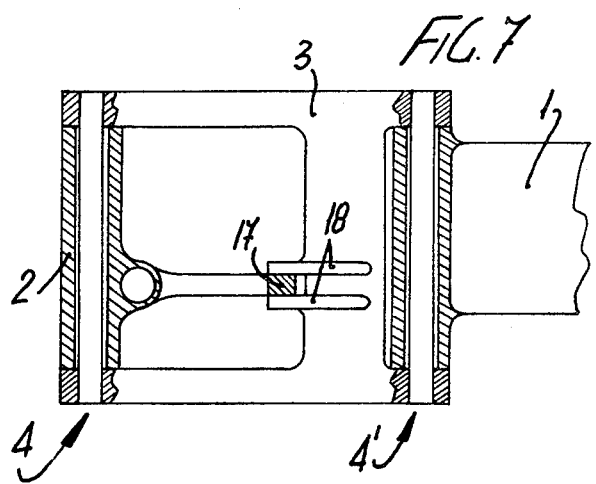
FIG. 7 is a plan view showing the device of FIG. 6 for manual control.

FIG. 6 schematically shows a possible solution, wherein the transverse movement of beam 1 can be manually carried out by providing said articulated arms 3 and 3' with a guide arc 17, along which the operator can move beam 1 to cause the milling body 1 to exit in the free section of the row, as shown at A of FIG. 4.

In this solution, the oleodynamic drive is dispensed with, while the connection between members 1 and 2 is still accomplished by means of articulated or pivoted arms 3. Circular sector 17 is secured to frame 2, enables to block said arm 3 and accordingly milling body 1 at the desired position by means of two brackets 18, the latter being integral with arm 3 by means of screws 19.

What is claimed is:

1. A farming implement, particularly for row cultivation, comprising a fork frame (2) adapted to be connected to a tractor; a support (1) for carrying operating tools (15); oleodynamic cylinder means (5) having one end (7) pivotally mounted to a rear portion of said fork frame (2); two spaced apart parallel pivoted arms (3,3') for connecting and supporting said support (1) together with said tools (15) to said fork frame (2); first means having a first component for pivotally mounting a first end of one of said pivoted arms (3,3') and a second component for pivotally mounting a corresponding first end of the other of said pivoted arms (3,3') to portions of said fork frame (2) spaced forwardly of the portion mounting said oleodynamic cylinder means (5); second means (4') having a first component associated with the other end of one of said pivoted arms (3,3') and a second component associated with the respective other end of the other of said pivoted arms (3,3'), said components being associated with portions of said support (1) closest to said fork frame (2) and being spaced rearwardly from the portion of said fork frame mounting said oleodynamic cylinder means (5) for pivotally mounting said other end of said pivoted arms (3,3') to said support (1); another end (8) of said oleodynamic cylinder means (5) being pivotally connected to one of said two pivoted arms (3,3') between components of said first and said second means (4,4') mounting said one arm of said fork frame and said support, said oleodynamic cylinder means (5) with its ends (7,8) being disposed in a plane extending substantially transverse to the direction of movement of the tractor, said plane being interposed between the components of said first means (4) and the components of said second means (4'); and feeler means operatively associated with said oleodynamic cylinder means for sensing obstacles and for actuating said oleodynamic cylinder means to exert a force on said one of said two pivoted arms (3,3') in a direction substantially transverse to the direction of movement of the tractor.

* * * * *

UNITED STATES PATENT AND TRADEMARK OFFICE
CERTIFICATE OF CORRECTION

PATENT NO. : 4,158,390
DATED : June 19, 1979
INVENTOR(S) : Antonio MASCHIO

It is certified that error appears in the above-identified patent and that said Letters Patent are hereby corrected as shown below:

In Section [73], after "Assignee:", change
"F.lli MASCHINO S.n.c." to read --F.lli MASCHIO S.n.c.--.

In Column 1, line 57, change " 3"' " to read --3'--.

In Column 1, line 58, change " 4" " to read --4'--.

Signed and Sealed this

Eighteenth Day of March 1980

[SEAL]

*Attest:*

*Attesting Officer*

SIDNEY A. DIAMOND

*Commissioner of Patents and Trademarks*